United States Patent [19]

Rau

[11] Patent Number: 4,488,569

[45] Date of Patent: Dec. 18, 1984

[54] APPARATUS WITH STAGED PRESSURE DIFFERENTIAL FOR CONTROLLING FLUID FLOW

[75] Inventor: Jim L. Rau, Lafayette, Ind.

[73] Assignee: TRW Inc., Cleveland, Ohio

[21] Appl. No.: 371,260

[22] Filed: Apr. 23, 1982

[51] Int. Cl.³ .................... F15B 13/07; G05D 11/03
[52] U.S. Cl. .................................. 137/101; 60/422; 91/516; 137/118
[58] Field of Search .............. 91/516, 513; 137/101, 137/118; 60/422

[56] References Cited

U.S. PATENT DOCUMENTS

| | | | |
|---|---|---|---|
| 3,385,311 | 5/1968 | Allen | 137/101 |
| 3,996,742 | 11/1976 | Goff | 137/101 X |
| 4,167,893 | 9/1979 | Johnson | 91/446 |

*Primary Examiner*—Irwin C. Cohen
*Attorney, Agent, or Firm*—Yount & Tarolli

[57] ABSTRACT

A fluid flow control system includes a priority valve which is controlled by a pressure differential applied across the valve, and which directs priority flow to a steering circuit and excess flow to an auxiliary circuit. The system insures that during steering, a relatively high pressure differential is required to shift the priority valve away from a priority steering position in which all fluid flow is delivered to the steering circuit. It also insures that when the flow to the steering circuit is sufficient to satisfy the steering demand, and the valve is also directing flow to the auxiliary circuit, a lower pressure differential is required to shift the valve in a direction for increasing the flow to the auxiliary circuit.

4 Claims, 6 Drawing Figures

APPARATUS WITH STAGED PRESSURE DIFFERENTIAL FOR CONTROLLING FLUID FLOW

BACKGROUND OF THE INVENTION

This application relates to an apparatus for controlling fluid flow to two different hydraulic circuits. More particularly, the application relates to a priority valve for controlling fluid flow to a primary hydraulic steering circuit and an auxiliary hydraulic circuit in a hydrostatic load sense vehicle steering system.

A hydrostatic load sense system for vehicle steering often includes a priority valve for controlling fluid flow from a pump to a primary steering circuit and an auxiliary hydraulic circuit. The pump may have either a fixed or a variable displacement. The steering circuit typically includes a steering motor and a steering controller that responds to movement of a steering wheel to direct fluid flow to the steering motor. The auxiliary circuit includes other hydraulically operated devices, such as brakes or an implement like a backhoe. When the vehicle's operator is not rotating the steering wheel, the priority valve directs most of the fluid from the pump to the auxiliary circuit where it is either bypassed to a reservoir, or utilized to operate the auxiliary devices. A small amount of fluid goes to the steering circuit to maintain a standby fluid pressure in the steering circuit and replenish any fluid lost through leakage.

When the steering wheel is rotated to steer the vehicle, the steering controller directs fluid flow to the steering motor and signals the priority valve to direct fluid flow from the pump to the steering circuit, in preference to the auxiliary circuit. The precise division of fluid flow between the steering circuit and the auxiliary circuit is a function of operator demand and the load on the steering motor. For example, if the vehicle operator turns the steering wheel rapidly and through a large angle of rotation, the signal from the controllor indicates that the steering circuit has a high demand for fluid flow and pressure. Whenever the steering circuit has a high demand for fluid flow and pressure, the priority valve shifts to a priority position in which all fluid flow from the pump is directed to the steering circuit if the pump flow is insufficient to satisfy the demand. If the steering wheel is turned less rapidly and through a smaller angle of rotation, the signal from the controller indicates less of a demand for fluid flow and pressure. When the fluid flow and pressure being directed to steering are sufficient to satisfy that demand, the priority valve can shift from its priority position and begin to direct fluid flow to the auxiliary circuit. When movement of the steering wheel stops and/or the demand for fluid flow and pressure in the steering circuit has been satisfied, the priority valve can shift further toward an auxiliary position in which fluid is supplied primarily to the auxiliary circuit.

A specific load sense hydrostatic steering system with a priority valve is described and illustrated in U.S. patent application Ser. No. 243,497 which is assigned to the assignee of the present invention. In that system, a priority valve bypasses flow to the auxiliary circuit when there is no steering. In response to an operator's initiation of steering, a control pressure signal is produced which anticipates a steering demand, and causes rapid movement of the priority valve to its priority position. During the steering manuever, the fluid flow to the steering motor is directed through a main flow control orifice in the controller. The main flow control orifice varies in area according to operator demand and steering load. The flow through that orifice is used to vary the control pressure signal, and thereby control the position of the priority valve, in accordance with operator demand and steering load.

In the system of U.S. application Ser. No. 243,297 the priority valve has a valve spool which is controlled by fluid pressures in a pilot flow which branches from the priority port of the priority valve. The pilot flow is directed through a fixed size orifice in the priority valve, and through the steering controller to a reservoir when there is no steering. Fluid pressure at the priority port is communicated with one end of the valve spool. Fluid pressure at the downstream side of the fixed orifice in the pilot flow is communicated with the other end of the priority valve spool. The pressures are applied to equal surface areas at the ends of the valve spool. The difference between the pressures applied to the valve spool produces a net force tending to move the valve spool in one direction. The net pressure force is opposed by the force of a biasing spring that acts on the valve spool. The biasing spring acts in a direction so as to bias the valve spool towards its priority position. The biasing force of the spring can be overcome by a sufficiently large net pressure force resulting from a large pressure differential across the fixed orifice which is applied to the opposite ends of the valve spool.

The steering system of application Ser. No. 243,497 responds to initiation of steering to provide a pressure signal which anticipates demand for fluid flow and pressure by the steering circuit. Specifically, upon initiation of a steering maneuver, and just before or as the main flow control orifice in the controller begins to direct fluid flow for steering, the system restricts the pilot flow, and abruptly instantaneously alters the pressure differential applied to the spool of the priority valve. A transient pressure increase is applied to the valve spool and, along with the biasing spring, applies a high biasing force to the valve spool urging the valve spool toward its priority position. The fluid delivered by the pump will ordinarily not be sufficient to balance the high biasing force caused by the transient pressure increase. Thus, the valve spool moves quickly toward its priority position before or as the steering controller is demanding fluid flow and pressure. In a system utilizing the principles of application Ser. No. 243,497, increased fluid flow and pressure to the steering circuit should be contemporaneous with or anticipate the demands of the steering circuit.

During steering, when the main flow orifice in the controller begins to direct fluid flow for steering, the pressure at the priority port of the priority valve continues to act on the one end of the priority valve spool, and the pressure at the downstream side of the main flow control orifice is connected to the other end of the valve spool. The transient pressure bias is dissipated by the priority valve's initial movement to its priority position. Thus, during steering, as the main flow control orifice in the controller varies in flow area in accordance with operator demand and steering load, the pressure differential applied to the priority valve spool varies. When the pressure differential reaches a predetermined point (indicating that the steering demand is being satisfied), the valve spool can shift away from its priority position and toward its auxiliary position to direct flow to the auxiliary circuit. The pressure differential is set at a predetermined high enough level so that when it is reached, the system can satisfy a steering demand while accounting for line losses which will exist in the fluid flow between the priority valve and the steering controller.

The design of the priority valve of U.S. application Ser. No. 243,497 will also cause it to try to hold a predetermined minimum pressure at the priority port when there is no steering. The pressure differential applied to the valve spool shifts the valve spool away from its priority position and toward its auxiliary position when the predetermined pressure is reached at the priority port. The predetermined minimum pressure is directly related to the pressure differential needed to satisfy a steering demand and overcome line losses. As the valve spool shifts away from its priority position, and begins to direct flow to the auxiliary circuit, the pressure at the priority port can vary with variations in the condition of the auxiliary circuit. Specifically, when the auxiliary implement is operated, there is a back pressure at the auxiliary port of the priority valve. The back pressure increases the pressure at which fluid must be delivered from the pump to overcome the back pressure. The pressure at the priority port will then exceed the predetermined minimum pressure required at the priority port. On the other hand, when the auxiliary circuit is not operating, but is bypassing all of its fluid flow to the reservoir, there is little or no back pressure at the auxiliary port of the priority valve. The pressure at the priority port is then held at the predetermined pressure. When there is no steering and little or no back pressure at the auxiliary port, the predetermined minimum pressure at the priority port could theoretically be reduced. Specifically, because the predetermined pressure in the system of application Ser. No. 243,497 is related to the pressure differential which must be applied to the priority valve spool to satisfy a steering demand and overcome associated line losses, the predetermined pressure is more than enough to overcome the line losses associated with the small pilot flow of fluid that occurs when there is no steering demand for fluid flow and pressure. The predetermined pressure could thus be reduced to a level which produces just enough pilot fluid to insure the transient pressure increase which urges the priority valve rapidly toward its priority position. In turn, the fluid flow and pressure which is required from the pump to hold the predetermined pressure at the priority port could also be reduced. If pump pressure could be reduced, there would be an energy savings, because the power for operating the pump could be reduced.

SUMMARY OF THE INVENTION

The invention is a hydrostatic load sense steering system in which the priority valve is constructed, to operate more efficiently than the valve shown in the steering system of U.S. patent application Ser. No. 243,497. The priority valve includes a valve element which has (a) a priority position in which it directs all fluid flow from a pump to the steering circuit, (b) an auxiliary position in which it provides a predetermined maximum flow to the auxiliary circuit and a predetermined minimum fluid flow to the steering circuit, and (c) intermediate positions in which it provides (i) fluid flows to the steering circuit which are between total input flow and the predetermined miniminum and (ii) fluid flows to the auxiliary circuit which are between no flow and the predetermined maximum. The invention insures that a high pressure differential is required to shift the priority valve element away from its priority position, but permits a lower pressure differential to be effective to shift the valve element between an intermediate position and its auxiliary position. Thus, under conditions where (i) there is no steering, (ii) the priority valve is directing fluid flow to the auxiliary circuit, and (iii) there is minimum back pressure from the auxiliary circuit, only a relatively low pressure differential is required to shift the position of the valve element. Further, the pump need only deliver fluid at relatively low pressure in order to maintain a relatively low predetermined pressure at the priority port of the priority valve. Under those conditions, the power for operating the pump can be reduced, which will save energy. Under conditions of steering which require the valve element to be in its priority position, a higher pressure differential is required to shift the valve element away from its priority position. That higher pressure differential is maintained during the steering demand, and rapid changes thereof. Hence, the pressure differential across the valve element is higher while the valve element is in its priority position than when the valve element is in its auxiliary position. That higher pressure differential represents a sustained portion of the transient pilot flow bias pressure. The differential pressure increase also affects the pilot flow.

In the preferred embodiment, the fluid pressure applied to one end of the priority valve element is communicated from the priority port which leads to the steering circuit. When the valve element is at an intermediate position, or between that intermediate position and its auxiliary position, the pressure from the priority port acts on a large area of the valve element. The relatively large area means that the fluid pressure acting on the one end of the valve element, and the pressure differential applied to the valve element, can be relatively low and yet, with the pilot flow assist, shift the valve element, and also hold a predetermined pressure at the priority port. When the valve element shifts to its priority position, the pressure from the priority port acts on a smaller area of the valve element. The smaller area means that the fluid pressure applied to the one end of the valve element, and the pressure differential applied to the valve element, must increase in order to shift the valve element. Thus, the pressure differential required to move the valve element away from its priority position must be higher than the pressure differential required to move the valve element between the intermediate position and an auxiliary position. Accordingly, when the valve element is at the intermediate position, or between the intermediate position and the auxiliary position, the flow and pressure from the pump may be reduced as long as the reduced flow and pressure from the pump can still generate the lower pressure differential. During steering, the higher pressure differential assures that flow and pressure will be brought to levels which can satisfy demand, despite the line losses in the flow to the steering circuit, before there can be fluid flow to the auxiliary circuit.

BRIEF DESCRIPTION OF THE DRAWINGS

Further features and advantages of the invention will become further apparent from the following detailed description taken with reference to the accompanying drawings wherein.

DETAILED DESCRIPTION OF THE PREFERRED EMBODIMENT

Figure 1:
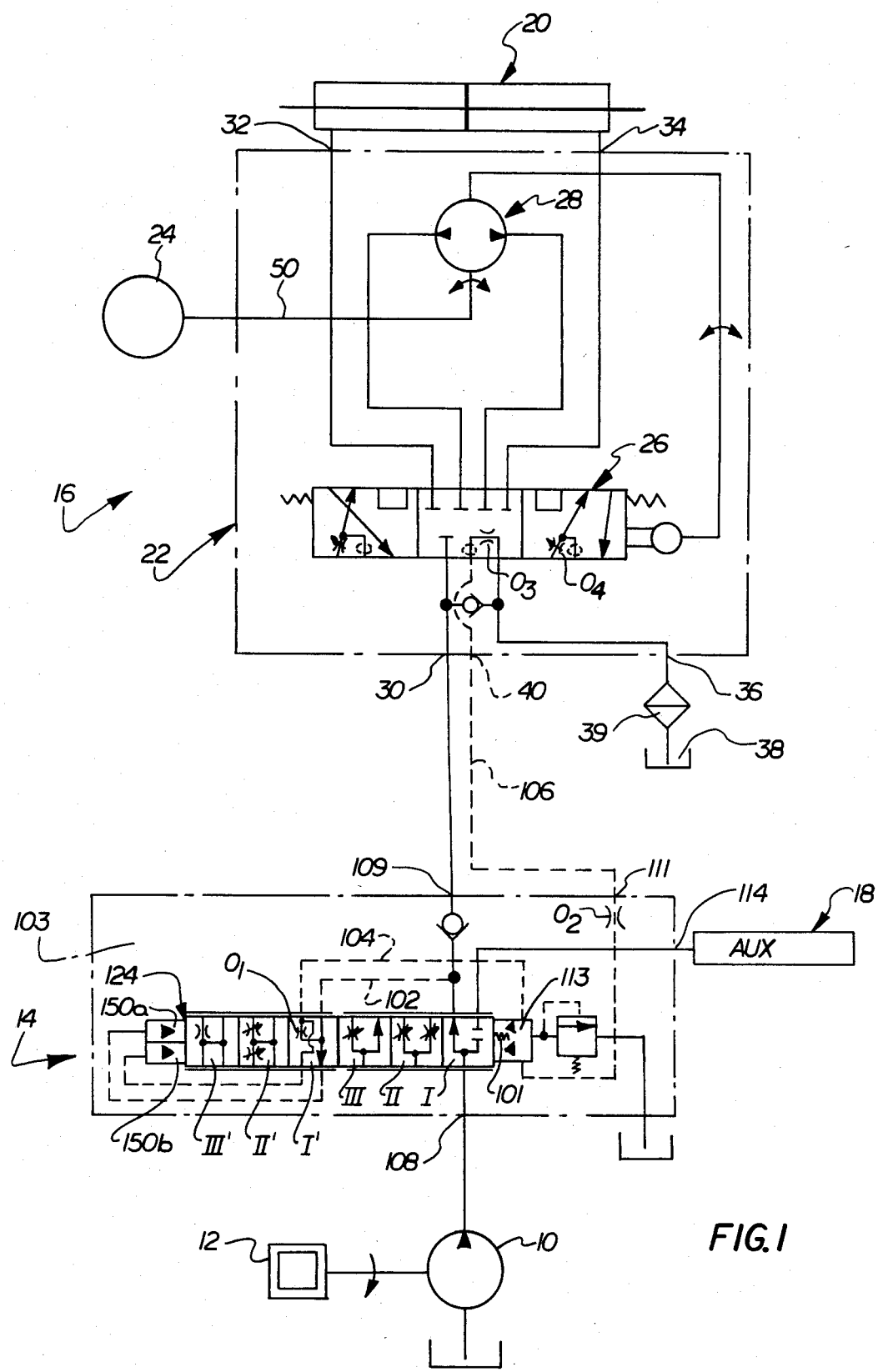
FIG. 1 is a schematic illustration of a load sensing steering circuit incorporating a priority valve element according to the invention.

As discussed above, the invention relates to a priority valve which is particularly useful in a load sense hydrostatic steering system for a vehicle. FIG. 1 illustrates schematically such a load sense hydrostatic steering system. The system includes a pump 10, which is driven by a motor or engine 12, and a priority valve 14 which directs fluid from the pump to a steering circuit 16 and one or more auxiliary circuits 18. The steering circuit 16 includes a steering motor 20, which is connected to the wheels of the vehicle, and a hydrostatic steering controller 22 which directs fluid to the steering motor 20 in order to steer the vehicle. The auxiliary circuit(s) 18 includes one or more devices which can be operated by fluid which is not needed for steering. For example, the auxiliary circuit(s) 18 might include an implement motor for operating an end loader or backhoe, and a control valve for controlling fluid flow to the implement motor. Further, in the auxiliary circuit(s) 18 the control valve would bypass flow to a reservoir, when the implement is not being operated.

The steering controller 22 is operated by the vehicle's steering wheel 24, and includes a control valve 26 and a metering unit 28. The controller 22 has an inlet port 30 connected with the priority valve 14, a pair of working ports 32, 34 connected to opposite chambers of the steering motor 20, a return port 36 connected to a reservoir 38 (through a filter 39), and a load sense port 40. The control valve 26 is spring biased to a neutral position in which it blocks flow from inlet port 30 to the metering unit 28. In response to a steering effort, the control valve 26 shifts away from the neutral position and to an operating position where it directs fluid from the inlet port 30 to the metering unit 28, directs metered flow to one chamber of the steering motor 20, and directs flow from the other chamber of the steering motor 20 to the return port 36 and the reservoir 38.

The priority valve 14 controls flow to the steering circuit 16 and to the auxiliary circuit(s) 18. It is designed to insure that during steering all flow is made available to the steering circuit 16. Only when there is either no steering, or when the flow and pressure to the steering circuit 16 are sufficient to effect the steering maneuver demanded, is flow directed to the auxiliary circuit(s) 18.

During a steering maneuver, the steering controller 22 provides a signal at its load sense port 40 which indicates a demand for flow and pressure. The signal is used to shift the priority valve 14 to its priority position (and if pump 10 is of the variable displacement type, to vary the displacement of the pump 10) in order to bring flow and pressure delivered to the controller 22 to levels which are sufficient to effect the steering demanded. When no steering is taking place, the control valve in controller 22 is biased to its neutral position, and the pressure at the load sense port 40 causes the priority valve 14 (and pump 10) to be in a condition in which it maintains flow and pressure at the controller inlet port 30 at minimum standby levels, and delivers excess flow from the pump 10 to the auxiliary circuit(s) 18.

Figure 2:
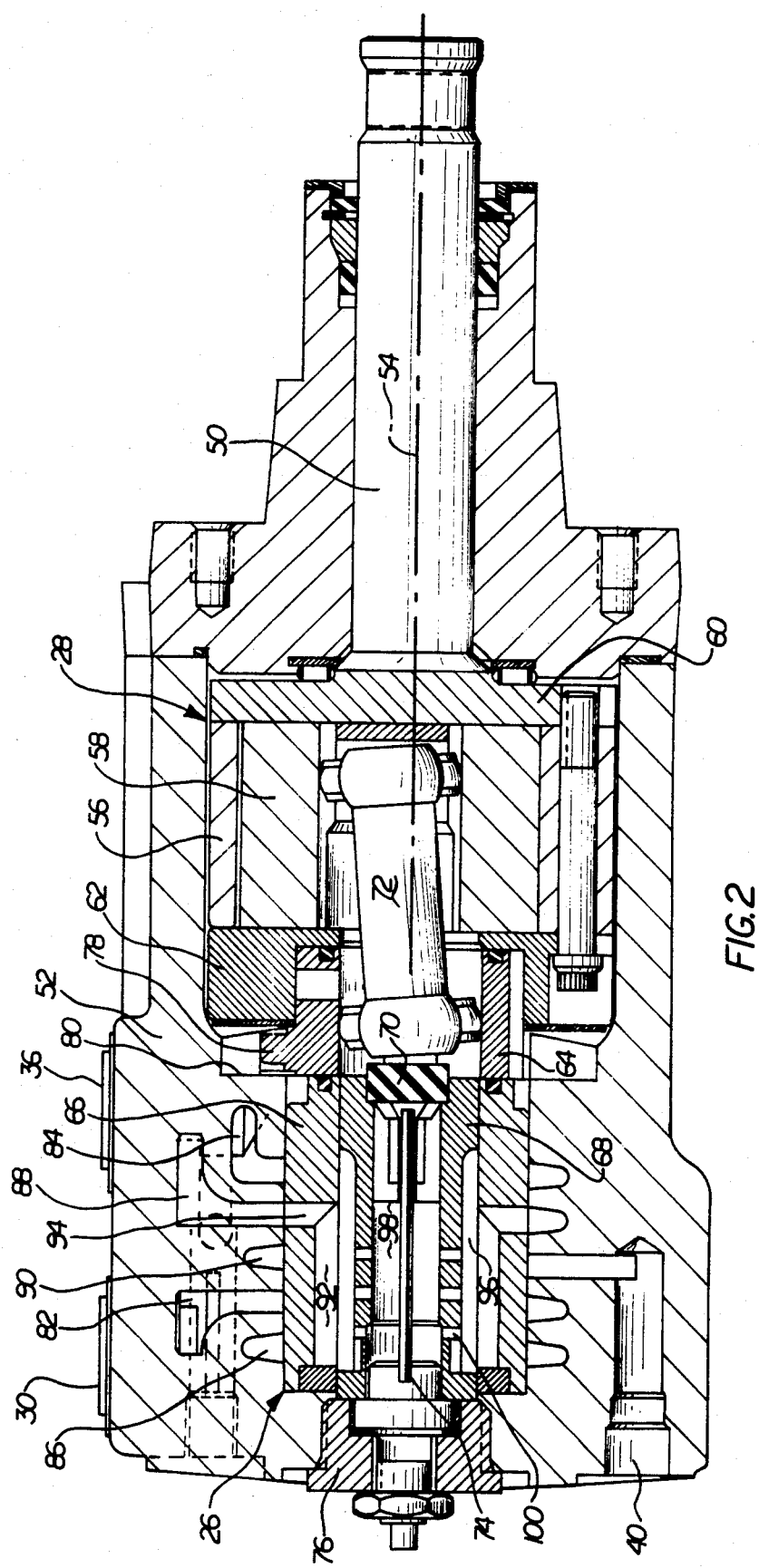
FIG. 2 is a longitudinal sectional view of a hydrostatic steering controller for use in controlling flow in the steering circuit of FIG. 1.

The hydrostatic steering controller 22 can take various forms, but is preferably the type shown and described in U.S. application Ser. No. 243,497, which disclosure is incorporated herein by reference. Referring to FIG. 2, the hydrostatic controller 12 has an input member 50 connected to the vehicle's steering wheel 24. The metering unit 28 and the control valve 26 are both disposed within a housing 52. The input member 50 extends into the housing 52, and is supported for rotation about a central axis 54. The metering unit 28 and the control valve 26 are connected with the input member 50, and are operated by rotation of the input member 50 about the central axis 52, as set forth more fully hereinafter.

The metering unit 28 is constructed according to the principles disclosed in U.S. Pat. No. 3,895,888, which is incorporated herein by reference. It includes a gerotor gear mechanism comprising an outer gear 56 having a series of internal teeth, and an inner gear 58 with external teeth numbering one less than the number of internal teeth on the outer gear 56. The outer gear 56 is bolted to a drive plate 60 which is fixed to the input member 50. Thus, the outer gear 56 rotates with the input member 50 about the central axis 54. The inner gear 58 is mounted eccentrically with respect to the outer gear 56, and is adapted to rotate about its central axis and to orbit relative to the outer gear 56.

The inner and outer gears 58 and 56 define expansible and contractible fluid pockets which expand and contract as the gears rotate and orbit relative to each other. A commutation valve arrangement controls flow to and from the expansible and contractible pockets in timed relation to the relative rotational and orbital movement of the gears. In accordance with the principles of U.S. Pat. No. 3,895,888, the commutation valve includes an outer member 62 which is bolted to the outer gear 56, and rotates therewith, and an inner member 64 which can rotate with the inner gear 58.

The control valve 26 is constructed according to the principles of U.S. Pat. No. 3,895,888 and U.S. application Ser. No. 243,497. It includes a part of the housing 52, a valve member 66 which is fixed in the housing, and a rotatable control valve member 68. The rotatable control valve member 68 is connected with the inner commutator valve member 64 (through an element 70), so that the control valve member 68 and the inner commutator valve member 64 can rotate jointly. An angular drive link 72 couples the inner gear 58 for joint rotation with the inner commutator valve member 64, thus also coupling the inner gear 58 for joint rotation with the rotatable control valve member 68.

A longitudinally extending torsion spring 74 biases the rotatable control valve member 68 to a neutral position. The torsion spring 74 has a first end connected to the rotatable control valve member 68 and a second end connected to a plug 76 which is fixed in the housing 52. Preferably, the torsion spring 74 comprises a pair of blades constructed according to the principles of U.S. Pat. No. 3,918,856.

When the rotatable control valve member 68 is in the neutral position, it blocks communication between the inlet port 30 and the metering unit 28. Thus, there is no flow from the inlet port 30 through the metering unit 28 to the steering motor 20.

The rotatable control valve member 68 is shifted from the neutral position to an operating position by rotation of the input member 50, in accordance with the principles of U.S. Pat. No. 3,895,888. In response to initial rotation of the input member 50, the outer and inner gerotor gears 56 also rotate. The rotation of the inner gerotor gear 58 rotates the control valve member 68 to shift the control valve member 68 away from its neutral position and to an operating position in which the inlet port 30 is communicated with one side of the metering unit 28 and the other side of the metering unit 28 is communicated with the steering motor 20. The relative range of rotation of the control valve member 68 away from the neutral position is limited by a lug 78 which is carried by inner commutator valve member 64 and which can move to a limited extent in a slot 80 formed in the housing 52.

Further, in accordance with the principles of U.S. Pat. No. 3,895,888 and U.S. application Ser. No. 243,497, the fluid flow from the inlet port 30 to the metering unit 28 and from the metering unit 28 to the steering motor 20 is controlled by the control valve 26. Referring to FIG. 2, the housing 52 includes an annular groove 82 connected with the inlet port 30, another annular groove 84 connected with the return port 36, a pair of annular grooves, 86, 88 connected to the working ports 32, 34, and an annular groove 90 connected with the load sense port 40. The fixed valve member 66 includes a plurality of longitudinal grooves 92 extending to its inner surface, and respective radial passages 94 for communicating those grooves with respective annular grooves (82, 84, 86, 88, 90) in the housing. The rotatable control valve member 68 also includes a plurality of longitudinal grooves 96 which extend to its outer periphery, and a longitudinally extending central passage 98 connected to certain of the grooves 96 via radial passages 100.

In response to rotation of the input shaft 50 in one direction, the control valve member 68 is rotated away from the neutral position and to an operating position. When the control valve member 68 is in an operating position, one side of the metering unit 28 is communicated with the inlet port 30 and the other side of the metering unit is communicated with one of the working ports 32, 34. The communication is through the commutator valve and either (i) the central passage 98 in the control valve member 68, or (ii) certain of the longitudinal grooves 96 in the control valve member 68. The other working port is communicated with the return port 36 and vented to the reservoir 38. The rotation of the outer gerotor gear 56 rotates the outer commutator valve member 62 relative to the the inner commutator valve member 64. The relative rotation valves the flow being directed to and from the expanding and contracting pockets of the gerotor metering unit 28.

The priority valve 14 is shown schematically in FIG. 1, and in detail in FIGS. 3-6. In FIG. 1, the priority, intermediate and auxiliary positions of the priority valve are shown at I, II and III, respectively. The valve has a pair of fluid cavities 150A, 150B at one of its ends, and the manner in which fluid is communicated with the cavities 150A and 150B in the priority, intermediate and auxiliary positions of the valve is shown at I', II' and III', respectively.

The priority valve 14 includes a housing 103 with an inlet port 108 connected to pump 10, a priority port 109 connected to the steering controller 22, and an auxiliary port 114 connected to the auxiliary circuit(s) 18. A valve spool 124 is biased by a spring 101 toward priority position (shown at I in FIG. 1) in which all flow from the pump 10 is directed to the steering circuit 16 through the priority port 109. A pressure tap 102 communicates pressure at the priority port 109 to the cavity 150A at one end of the valve spool 124. The pressure at port 109 acts on the valve spool 124 in opposition to the biasing spring 101. A pilot conduit 104 directs a pilot flow of fluid across a pair of orifices $0_1$, $0_2$, through a pilot port 111 and to a fluid conduit 106 leading to the load sense port 40 of the controller 22. In the controller, the pilot flow is directed across a neutral vent orifice $0_3$ and to the reservoir 38 when the controller is neutral. Additionally, the pressure between the orifices $0_1$, $0_2$ is communicated with pressure cavity 113 which contains the spring 101. Pressure in the cavity 113 acts on the priority valve element 124 in addition to the force of the spring 101.

In accordance with the principles of U.S. patent application Ser. No. 243,497, when the control valve element 68 is shifted away from its neutral position, the pilot flow through the neutral vent orifice $0_3$ to the reservoir 38 is restricted. A pressure surge results in the fluid conduit 106. The pressure surge travels back to the spring cavity 113 of the priority valve, and brings the pressure in the spring cavity 113 to a level which can exceed the pressure in the conduit 102. The pressure in conduit 102 is applied to the cavity 150A which is at the end of the priority valve spool 124 opposite to the spring cavity 113. Thus, the fluid pressure forces on the spool 124 are instantaneously overbalanced, and in conjunction with the spring 101 can urge the priority valve spool 124 quickly toward its priority position (I, I') in which (i) all flow is directed to the steering circuit 16, and (ii) cavity 150B is also connected to conduit 104 to effect a higher operating differential.

When the control valve element 68 reaches an operating position, it provides a variable area orifice $0_4$ in the fluid flow path leading from the inlet port 30 to the metering unit 28. The downstream side of variable orifice $0_4$ communicates with load sense port 40 and thereby with the fluid conduit 106. Thus, during steering, the pressure drop across the variable size orifice $0_4$ in the steering controller is reflected in the fluid pressure differential or drop across the priority valve spool 124. The pressure drop across valve spool 124 acts to position the valve spool 124 during steering.

FIGS. 3-6 show the details of the priority valve 14 constructed according to the principles of the invention. As discussed above, the valve housing 103 includes an inlet port 108 connected to the pump 10, a priority port 109 connected to the steering controller 22, and an auxiliary port 114 connected to the auxiliary circuit(s) 18.

In the priority valve of FIGS. 3-6, the flow at the inlet port 108 is directed to three annular inlet cavities 116, 118, and 120 in the valve's housing 103. Each of the cavities 116, 118, 120 communicates with an axially extending central bore 122 in the housing 103, and the valve spool 124 is axially slidable in the central bore 22. A first annular outlet cavity 117 is provided in housing 103 between the inlet cavities 116 and 118. A first outlet passage 119 communicates the first annular outlet cavity 117 with the priority port 109. A second annular outlet cavity 121 is provided in the housing 103 between the inlet cavities 118 and 120. A second outlet passage 123 communicates the second outlet cavity 121 with the auxiliary port 114.

The valve spool 124 has four annular lands 132, 134, 136, 138, which define three annular grooves 126, 128, 130 spaced axially along the spool 124. The valve spool 124 can restrict flow from the inlet port 108 to the priority port 109 by restricting communication between the inlet cavities 116, 118 and the outlet cavity 117. It can allow flow from the inlet port 108 to the priority port 109, by directing flow from inlet cavities 116, 118 through the grooves 126, 128 and to the outlet cavity 117. The valve spool 124 can also direct flow to the auxiliary port 114, by directing flow from inlet cavities 118, 120, through the grooves 128, 130 and to the outlet cavity 121.

Figure 3:
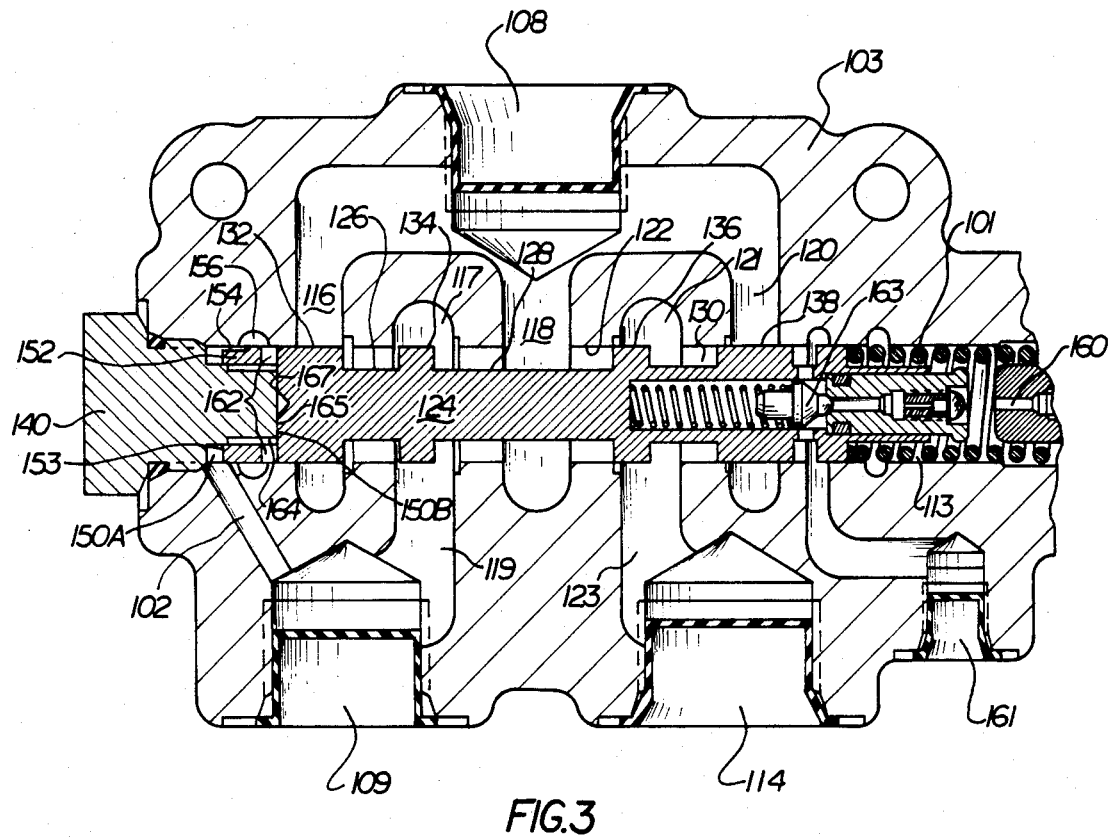
FIG. 3 is a longitudinal sectional view of a priority valve according to the invention, with the valve element in its priority position.
Figure 5:
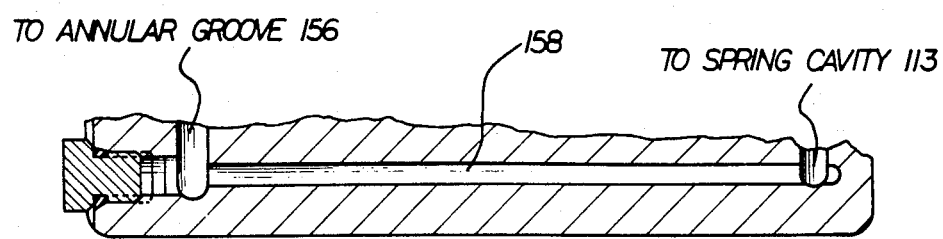
FIG. 5 is a fragmentary sectional view of part of the priority valve housing, showing part of the means which creates the pilot flow conduit.

Referring now to FIG. 3, the priority valve spool 124 is shown in its priority position, which is also the position it would be in at start-up of the pump 10. The biasing spring 101 urges the valve spool 124 toward a leftmost position where an end surface 167 of the spool abuts an end surface 165 of a plug 140 which is fixed in the valve housing 103. In the priority position of the valve spool 124, all flow from the inlet port 108 is directed to the priority port 109 through the annular inlet cavities 116, 118 and through the grooves 126, 128 of the valve spool 124. The annular cavities 118, 120 are blocked from communication with the auxiliary port 114 by lands 136 and 138 of the valve spool 124.

When no steering is taking place, the valve spool 124, under the conditions described hereinafter, can move axially away from its priority position and toward an auxiliary position shown in FIG. 4 (and also at III, III' in FIG. 1). In the auxiliary position, communication between the annular inlet cavities 116, 118 and the priority port 109 is substantially restricted. Maximum communication exists between the inlet port 108 and the auxiliary port 114.

Figure 6:
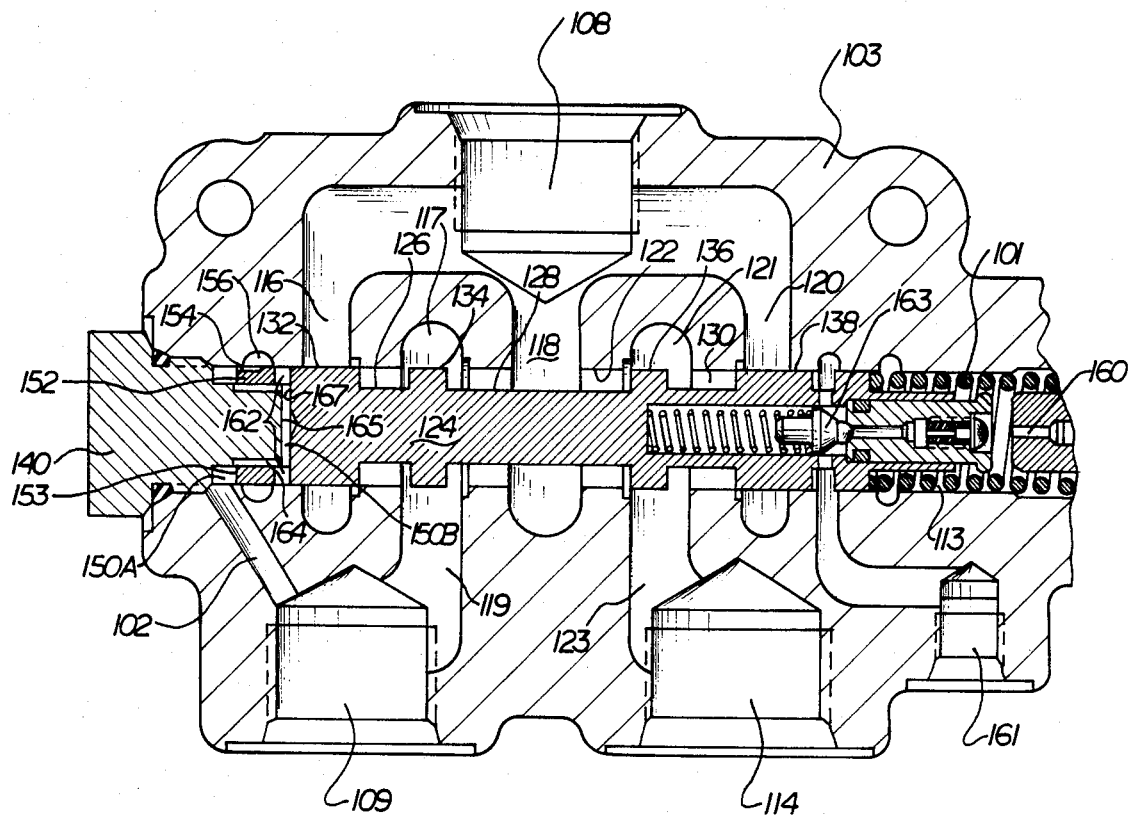
FIG. 6 is a sectional view of a priority valve according to the invention, with the valve element in an intermediate position.

The valve spool 124 also has intermediate positions between the priority position and the auxiliary position (shown at II, II' in FIG. 1). In the intermediate positions of the valve spool 124, flow at the valve's inlet port 108 is divided between the priority port 109 and the auxiliary port 114. As an example, the valve spool 124 is shown in FIG. 6 in one of its intermediate positions. In the position of FIG. 6 the valve spool 124 directs fluid flow from inlet port 108 to the priority port 109 and the auxiliary port 114 through the annular inlet cavity 118 and through the groove 128 of the valve spool 124. The flow to the priority port 109 is across the land 134, and the flow to the auxiliary port 114 is across the land 136. There is no flow through the annular inlet cavities 116 and 120.

In the priority valve, the pressure cavity 150A is defined between the plug 140 and a cylindrical extension 152 formed on the left hand end of the valve spool 124. The cylindrical extension 152 has an annular end surface 153. As seen in FIG. 3, there is a small recess 154 in the cylindrical extension 152. Recess 154 communicates the pressure cavity 150A with an annular groove 156 in the housing 103. In turn, the annular groove 156 in the housing communicates with the reduced pressure spring cavity 113 at the other end of the valve spool, through a passage 158 (FIG. 5) in the housing. (The passage 158 corresponds to conduit 104 shown in FIG. 1.) The spring cavity 113 communicates through an orifice 160 with the pilot port 111, and thereby with the load sense port 40 of the controller 22. The recess 154 in the cylindrical extension 152 of the valve spool 124 cooperates with the housing recess 156 to form the orifice $0_1$ in the system shown in FIG. 1. The orifice 160 is the orifice $0_2$. The priority valve housing 103 has a relief port 161 which is connected to the reservoir 38. A relief valve 163 can open to vent the spring cavity 113 to the relief port 161 and the reservoir 38 in the event the pressure in spring cavity 113 exceeds a predetermined level.

In the priority position of FIG. 3, the pressure from the priority port 109 acts only on the annular end surface 153 of cavity 150A, while the rest of the radial end surface of spool 124 (i.e., the end surface 167 which forms part of cavity 150B) sees only the reduced pressure in groove 156. Specifically, a pair of diametrically opposed hole 162 extend radially through the cylindrical extension 152 on the valve spool 124. The holes 162 communicate with the annular groove 156 in the housing when the valve spool 124 is in the priority position of FIG. 3. When the valve spool 124 is in the priority position, the radial holes 162 communicate the end surface 167 with the annular groove 156, and thereby with the spring cavity 113. After a range of movement of the valve spool 124 away from the priority position, the entire end surface of the spool (i.e., both surfaces 153 and 167 of cavities 150A and 150B) see the pressure from the priority port 109. When the valve spool 124 has moved to the intermediate position of FIG. 6, the communication between the annular groove 156 and the radial holes 162 is blocked, and a recess 164 in the plug 140 is communicated with pressure cavity 150A. The recess 164 extends to the end surface 165 of plug 140, and communicates the pressure cavity 150A with the end surface 167 of cavity 150B. In that intermediate position, pressure from the priority port 109 exists in the pressure cavity 150A and acts on annular end surface 153 of the extension 152 and also on the remaining end surface 167 of cavity 150B the valve spool. Thus, the pressure acts against the entire radial end surface area of the valve spool 124. As the valve spool 124 moves between the intermediate position of FIG. 6 and the auxiliary position FIG. 4, the recess 164 maintains communication between the pressure cavity 150A and the end surface 167 and pressure in the cavity 150A acts upon the entire cross sectional end surface of the valve spool 124 (i.e., cavities 150A and 150B) in a predetermined manner.

In accordance with the general concepts of U.S. application Ser. No. 243,497, the difference between the pressures on the opposite ends of the priority valve spool 124 creates a net fluid pressure force which acts on the valve spool 124 against the force of the spring 101. When there is no steering demand, or when steering demand is being satisifed, then whenever the net pressure force exceeds the force of spring 101, the valve spool 124 can move away from its priority position and toward its auxiliary position for increasing flow to the auxiliary circuit(s). In accordance with the further principles disclosed in the an application of Charles Barker entitled "Fluid Flow Control Apparatus" (U.S. application Ser. No. 361,851, filed on Mar. 25, 1982), as the valve spool 124 moves away from its priority position, it stages the flow to the auxiliary circuit(s). Specifically, at an initial amount of travel the valve spool 124 allows flow only from the inlet cavity 118 to the auxiliary port 114 across the valve land 136. With a further range of travel, the valve spool 124 increases flow to auxiliary port 114 by permitting flow from the inlet cavity 120 across valve land 138.

As discussed earlier, it is desirable for the valve spool 124 to hold a predetermined pressure at the priority port 109 when there is no steering. The staging of flow to the auxiliary port 114 allows the valve spool 124 to move smoothly from a priority position, through a first stage (low) flow and to a second stage (high) flow to auxiliary, while maintaining the predetermined pressure at the priority port 109. The staging of flow is particularly important when the auxiliary circuit is bypassing all its fluid to the reservoir. Under such conditions, the variable orifices provided by the staged flows produce a sufficient pressure drop in the flow to auxiliary to maintain the predetermined pressure at the priority port. When the auxiliary circuit is operating, the back pressure provided at the auxiliary port helps the valve spool 124 hold the predetermined pressure at the priority port 109.

Figure 4:
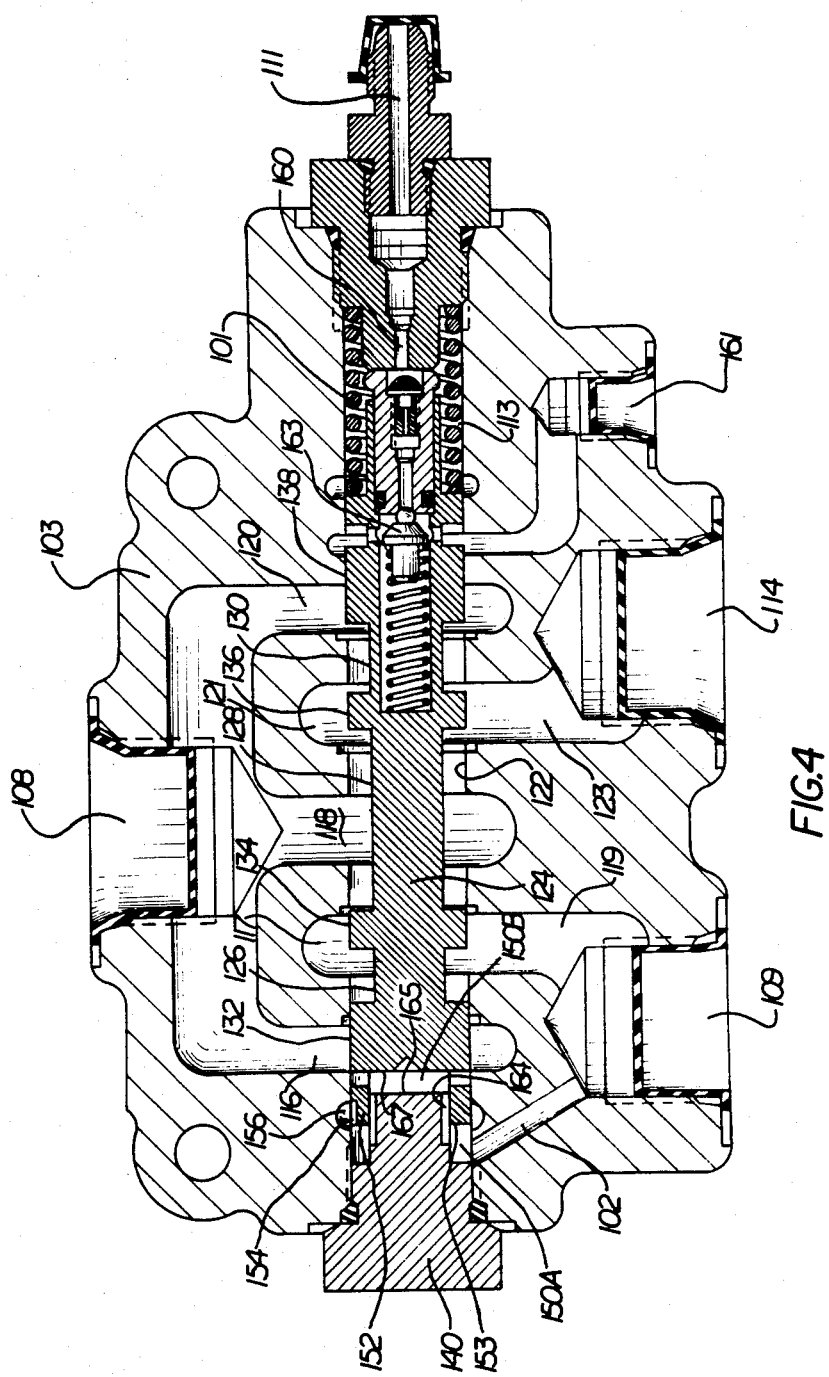
FIG. 4 is a sectional view of a priority valve according to the invention, with the valve element in its auxiliary position.

In accordance with the invention, the effective area of the valve spool 124 which is acted on by pressure in cavity 150 is different when the valve spool 124 is in its priority position (FIG. 3) than when the valve spool is at the intermediate position (FIG. 6), or between the intermediate position and its auxiliary position (FIG. 4). Therefore, the pressure differential required to move the valve spool 124 away from its priority position is different than the pressure differential required to move the valve spool between the intermediate position of FIG. 6 and the auxiliary position of FIG. 4. With the valve spool 124 in its priority position, pressure in the cavity 150A is blocked from communication with the cavity 150B. Thus, the pressure in cavity 150A acts only against the annular end surface 153 of cylindrical extension 152. When the valve spool 124 is at the intermediate position of FIG. 6, or between the intermediate position and the auxiliary position of FIG. 4, pressure in cavity 150A is communicated through recess 164 with the end surface 167, cavity 150B of the valve spool 124. The pressure acts against the full cross sectional area of the valve, spool 124. Thus, when valve spool 124 is in an intermediate position (FIG. 6), a relatively low pressure acting on the opposite ends of the valve spool 124 is sufficient to create a net pressure force that will compress spring 101 and shift the valve spool 124 toward its auxiliary position. When valve spool 124 is in the priority position (FIG. 3), a relatively high difference in the pressures acting on the opposite ends of the valve spool 124 is needed to create a net pressure force that can compress the spring 101 and shift the valve spool 124 away from the priority position, because only a relatively small area of the valve spool (i.e., annular end surface 153) is acted on by the pressure in the chamber 150A.

When the valve spool 124 has moved from the priority position to the intermediate position of FIG. 6, the area of the valve spool 124 which is acted on by the pressure in the cavity 150A includes end surface 153 of cavity 150A and also end surface 167 of cavity 150B. The pressure differential required to shift the valve spool 124 from that intermediate position of FIG. 6 and further toward its auxiliary position (FIG. 4), is therefore decreased. For example, assume the spring force was equal to the force of a fluid pressure of 65 psi applied to the full area of the valve spool. Assume further that the full area of the valve spool was twice the area of annular end surface 153 of the cylindrical extension 152. When the valve spool 124 has moved to the intermediate position of FIG. 6, the pressure differential required to shift the valve spool 124 further toward its auxiliary position (FIG. 4) would have to overcome the spring force (e.g. 65 psi). On the other hand, when the valve spool 124 has shifted back to the priority position of FIG. 3, and pressure is continued to cavity 150A only, which has an area which is only half the full valve area, the pressure differential required to overcome the spring force to shift the valve spool away from its priority position would double (i.e. to 130 psi).

The foregoing concepts improve the overall efficiency of a system such as in FIG. 1. System pressure at the priority port of the priority valve must initially elevate to an extent necessary to achieve the higher pressure differential before the valve spool 124 can move away from its priority position. Once the system pressure has elevated and the valve spool 124 has moved to the intermediate position of FIG. 6, the pressure differential required to move the valve spool further toward its auxiliary position drops. Thus, only that lower differential has to be provided by the system in order to move the valve further in a direction for increasing the flow to the auxiliary circuit. With that lower differential, when the auxiliary circuit is bypassing flow to the reservoir, the flow and pressure from pump 10 which is needed to produce the lower differential are relatively low, and the pump can be run only at a speed necessary to produce that minimum flow and pressure.

When steering occurs, the pressure is increased in the spring cavity 113, and the valve spool 124 is quickly moved to its priority position (FIG. 3). Since the steering controller is closed center (i.e., no flow from its inlet port 30 in neutral), when the valve spool 124 moves to its priority position, the pressures at the inlet port 108 and at the priority port 109 initially drop. The higher pressure differential which would now be required to shift the valve spool away from its priority position means that the pressure at the priority port 109 must rise to a level which is sufficient to create the higher differential, before the valve spool 124 can shift away from the priority position. This helps insure that during steering, even with high line losses in the flow to steering, system pressure will be maintained at levels in the steering circuit which can satisfy the steering demand before the valve spool will shift from its priority position. Thus, according to the invention applicant has provided new and useful concepts for controlling flow to a primary steering circuit and an auxiliary circuit.

What is claimed is:

1. A priority valve for controlling fluid flow from a source of fluid to a steering circuit and an auxiliary circuit, said priority valve including a housing having an inlet port for connection to the source of fluid, a priority port for connection to the steering circuit, and an auxiliary port for connection to the auxiliary circuit, said housing having a fluid chamber communicating with said inlet port, and a valve element movable axially in said fluid chamber for controlling flow between said inlet port, said auxiliary port and said priority port, said valve element being movable between a priority position in which all flow at said inlet port is directed to said priority port and an auxiliary position in which said valve element establishes maximum communication of said inlet port with said auxiliary port and minimum communication of said inlet port with said priority port, said valve element having intermediate positions between said priority and auxiliary positions and in which said valve element communicates said inlet port with said priority port and said auxiliary port, means for providing a pressure differential across said valve element for moving said valve element between its priority and auxiliary positions including biasing means for biasing said valve element to its priority position and fluid pressure means for applying a force to said valve element in a direction for urging said valve element toward said auxiliary position, said fluid pressure means including a first fluid pressure cavity at one end of said valve element, means for communicating fluid pressure to said first fluid pressure cavity for acting on said one end of said valve element for moving said valve element between said priority and auxiliary positions, and means communicating the fluid pressure in said first fluid pressure cavity to a first area of said one end of said valve element when said valve element is in an intermediate position and means communicating the first fluid pressure to a second area of said one end of said valve element which is less than said first area for changing the pressure differential for moving the valve element when the valve element is in said priority position, whereby the pressure differential required for moving said valve element when said valve element is in said priority position is greater than the pressure differential required when said valve element is in the intermediate position.

2. A priority valve as defined in claim 1 wherein said biasing means acts on the other end of said valve element so that the pressure in said first fluid pressure cavity acts on said valve element in opposition to said biasing means.

3. A priority valve as defined in claim 2 wherein a second fluid pressure cavity is provided at said other end of said valve element and said biasing means comprises a biasing spring disposed in said second fluid pressure cavity, said priority valve including means for directing a pilot flow of fluid from said priority port through an orifice and to a pilot port in said housing, and means communicating pressure at the upstream side of said orifice with said first fluid pressure cavity and pressure at the downstream side of said orifice with said second fluid pressure cavity.

4. A priority valve as defined in claim 2 or claim 3 wherein said valve element and said housing cooperate to expose only said second area to the fluid pressure in said first fluid pressure cavity when said valve element is in said priority position and to expose said first area to the fluid pressure in said first fluid pressure cavity when said valve element is in said intermediate position.

* * * * *